(12) United States Patent
Chen et al.

(10) Patent No.: US 7,160,518 B2
(45) Date of Patent: Jan. 9, 2007

(54) CYCLONE SEPARATOR

(75) Inventors: Ye-Mon Chen, Sugar Land, TX (US);
Thomas Shawn Dewitz, Bellaire, TX (US); Hendricus Arien Dirkse, Amsterdam (NL); Hubertus Wilhelmus Albertus Dries, Amsterdam (NL); Richard Addison Sanborn, Houston, TX (US)

(73) Assignee: Shell Oil Company, Houston, TX (US)

( * ) Notice: Subject to any disclaimer, the term of this patent is extended or adjusted under 35 U.S.C. 154(b) by 514 days.

(21) Appl. No.: 10/475,381

(22) PCT Filed: Apr. 11, 2002

(86) PCT No.: PCT/EP02/04144

§ 371 (c)(1),
(2), (4) Date: Oct. 20, 2003

(87) PCT Pub. No.: WO02/085527

PCT Pub. Date: Oct. 31, 2002

(65) Prior Publication Data

US 2004/0115102 A1    Jun. 17, 2004

(51) Int. Cl.
*B32B 5/02* (2006.01)
*F27B 15/08* (2006.01)
(52) U.S. Cl. ................................ 422/147; 422/144
(58) Field of Classification Search ............... 422/144, 422/147; 208/163
See application file for complete search history.

(56) References Cited

U.S. PATENT DOCUMENTS 4,664,889 A * 5/1987 Steenge et al. ............. 422/147
4,692,311 A * 9/1987 Parker et al. ............... 422/144
4,778,488 A * 10/1988 Koers ......................... 95/271
5,039,397 A   8/1991 Haddad et al.
5,869,008 A   2/1999 Dewitz
6,296,812 B1 * 10/2001 Gauthier et al. ............ 422/144
6,569,317 B1 *  5/2003 Dirkse et al. ............... 208/163
6,846,463 B1 *  1/2005 Dries et al. ................. 422/147
2006/0049082 A1 *  3/2006 Niccum et al. ............. 208/113

FOREIGN PATENT DOCUMENTS

| EP | 0332277  | 9/1989 |
| EP | 0545771  | 6/1993 |
| EP | 1194243  | 4/2003 |
| WO | 00/27949 | 5/2000 |

OTHER PUBLICATIONS

International Search Report dated Oct. 23, 2002.

* cited by examiner

*Primary Examiner*—N. Bhat
(74) *Attorney, Agent, or Firm*—William E. Hickman

(57) ABSTRACT

A cyclone separator provided with an inlet for receiving gas and solid particles, + a gas outlet at its upper end and a lower tubular part, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a primaxy fluidizing medium are present.

12 Claims, 4 Drawing Sheets

State of the art

CYCLONE SEPARATOR

FIELD OF THE INVENTION

The invention is directed to a cyclone separator provided with an inlet for receiving gas and solid particles, a gas outlet at its upper end and a lower tubular part. The invention is especially directed to such a cyclone separator as part of a fluid catalytic cracking (FCC) reactor wherein the cyclone separator is fluidly connected to the downstream part of an elongated reactor riser and wherein the gas is cracked hydrocarbon vapours and the solids are cracking catalyst particles.

BACKGROUND OF THE INVENTION

An FCC reactor, provided with a riser and a cyclone separator as above, is disclosed in U.S. Pat. No. 5,039,397. This publication describes an elongated vertical reactor vessel comprising the downstream part of a reactor riser. The reactor riser is fluidly connected to one or more primary cyclones, which are in turn connected to one or more secondary cyclones each. The cleaned gas obtained in the secondary cyclone is discharged at the upper end of the reactor vessel. The primary and secondary cyclones discharge the separated FCC catalyst particles to below into a dense fluidized bed via their respective diplegs. As fluidization gas steam is added in order to strip adsorbed and/or entrained hydrocarbons, which are present in the catalyst flow. At the lower end of this stripping zone stripped catalyst particles are discharged from the vessel and transported to a separate regenerator vessel. In the regenerator vessel coke is removed by means of combustion from the catalyst in order to provide a regenerated catalyst, which can be reused in the reactor riser.

A disadvantage of the above-described process is that the stripping efficiency of existing units is often too low.

SUMMARY OF THE INVENTION

The aim of the present invention is to provide a cyclone separator which use results in an improved stripping efficiency.

This aim is achieved with the following cyclone separator. Cyclone separator provided with an inlet for receiving gas and solid particles, a gas outlet at its upper end and a lower tubular part, wherein the lower tubular part is provided with a closed lower end, through which closed lower end a substantially vertical particle withdrawal conduit extends from a position below the closed lower end to a position in the tubular part and below the inlet for receiving gas and solid particles, said conduit being provided with openings to withdraw solid particles from the cyclone separator and wherein said conduit has a smaller cross-sectional area than the lower tubular part, thereby defining a space between conduit and inner wall of the lower tubular part, wherein in the lower part of said space main means to add a primary fluidizing medium are present.

DETAILED DESCRIPTION OF THE INVENTION

Figure 1:
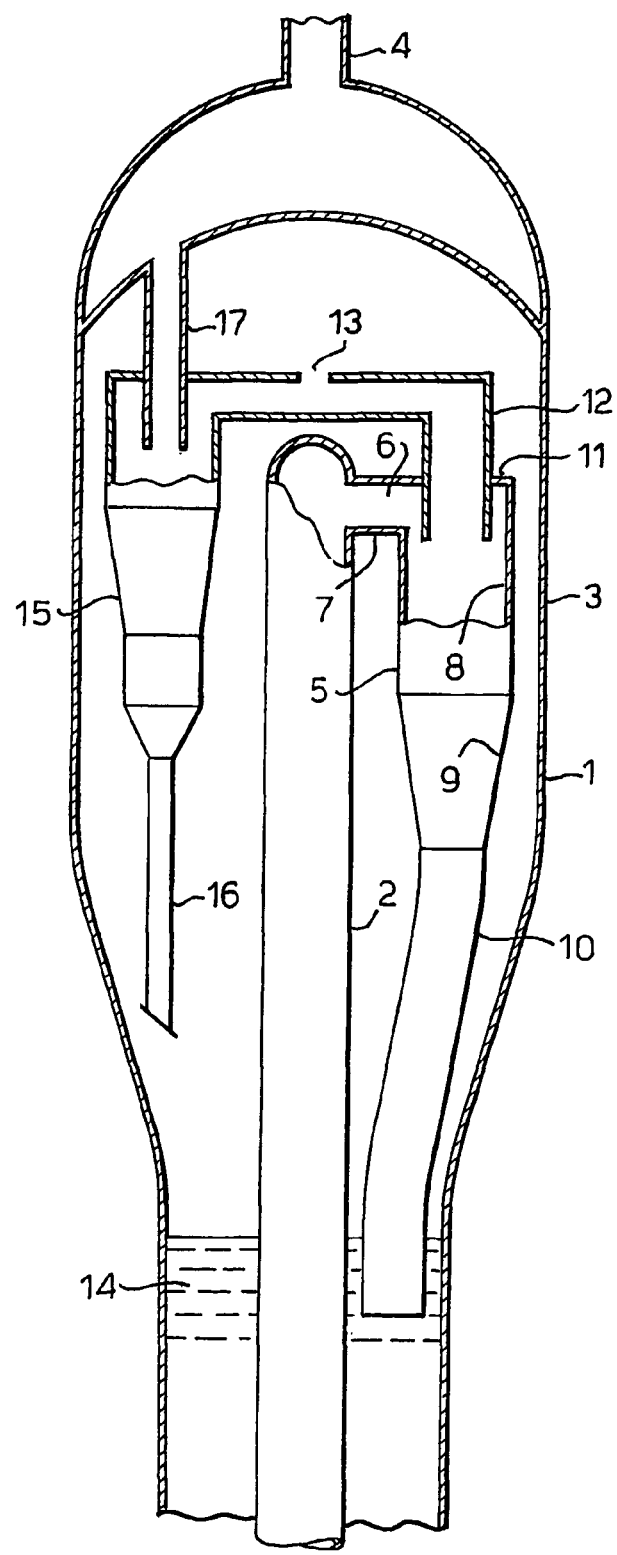
FIG. 1 illustrates the prior art FCC reactor vessel.

Applicant found that the cyclone according to the invention can enhance the overall stripping efficiency when used in a fluid catalytic cracking unit and when the fluidizing medium added to the lower end of the cyclone is a stripping medium, for example steam. A next advantage is that many existing FCC reactors provided with cyclone separators can easily be modified into the reactor according to the invention. A further advantage is that the operation of the cyclone provided with the solids discharge conduit and its fluidised bed is less dependent of the pressure outside the cyclone separator. In contrast the separation efficiency of, for example, the prior art FCC cyclone, not having this specific lower tubular end, is influenced by the pressure fluctuations in the FCC reactor vessel. Applicants further found that the separation efficiency of a separation system comprising said cyclone and secondary separation means, for example a secondary cyclone, is not significantly negatively affected when compared to a separation system comprising a state of the art primary and secondary cyclone.

In use a dense fluidised bed will be present in the, preferably annular, space between the catalyst withdrawal conduit and the inner wall of the tubular part. The bed is kept in a fluidization mode by means of primary fluidization gas supplied to the lower end of the dense fluidised bed. Solids may be withdrawn from this fluidization zone via the openings present in the particle withdrawal conduit. Preferably one or more openings are present in the upper end of the catalyst withdrawal conduit. Suitably the upper end of the particle withdrawal conduit is open. The upper most positioned openings in the conduit define the maximum fluidised bed level.

Preferably one or more openings are also present in the lower half of the particle withdrawal conduit through which solids can be discharged from the cyclone. This is especially preferred when the fluidised bed in the lower tubular part of the cyclone separator also functions as a stripping zone, as for example in a FCC configuration. In normal use most solids will then be discharged through these lower positioned openings. The opening at the upper end of the withdrawal conduit will then only serve as withdrawal opening in case of blockage of the secondary openings by for example coke or debris. In this manner more countercurrent contact between stripping medium and catalyst takes place in the fluidised bed zone, which is advantageous for the stripping efficiency. More preferably a row of such openings at the same elevation are present in the lower half of the conduit. Even more preferably two or more of such rows are present above each other, wherein, in use, most solid particles will flow through the lower openings while through the upper openings gas is vented and pressure is balanced. The same effect of the two rows can be achieved by making use of rectangular designed openings, wherein the elongated side of the opening extends upwards. Other possible shapes of the openings are, for example, circular, keyhole shaped, oval shaped or straight-sides holes with circular ends. These openings are suitably at the same elevation or above the position of the means to add the primary fluidizing medium, such to ensure that the solid particles are sufficiently fluidised to flow easily through the openings.

A preferred opening to withdraw solid particles from the lower tubular part of the cyclone is one or more substantially horizontal conduits fluidly connecting the lower tubular part and the particle withdrawal conduit, wherein said substantially horizontal conduit is provided with means to add a secondary fluidizing medium. This substantially horizontal conduit is positioned below the position of the means to add the primary fluidizing medium of the separation cyclone as described above. Because the solid particles are not fully fluidised below the primary fluidizing means solid particles will not or at a very small rate flow through these substantially horizontal conduits. By adding the secondary fluidizing medium separately to the connecting conduits the flow of solid particles will increase significantly. If for example FCC catalyst particles are the solid particles the flow rate can be increased to more than 10 times by adding the secondary fluidizing medium to the connecting conduit. Thus a means for controlling the flow of solid particles from the fluidised bed present in the lower tubular part of the cyclone is obtained. This enables one to control the bed level of said fluidised bed by measuring the bed level, by for example well-known techniques as pressure measurements at different elevations in the cyclone, and adjusting the flow of the secondary fluidizing medium to the connecting conduits to adjust the bed level to the desired height at different catalyst circulation rates. A well-defined and controlled bed level is advantageous because all solid particles will be sufficiently contacted with the fluidizing medium before being withdrawn from the fluidised bed. When applied in a FCC cyclone separator and the fluidizing medium is a stripping gas a more efficient stripping of FCC catalyst particles is thus achieved. The number of such connecting conduits can be from one to forty or more, but preferably from four to sixteen.

The means to supply stripping gas suitably comprises at least one gas injection ring. This gas injection ring may be connected to a stripping gas supply conduit which is either connected to the stripping supply means of the main stripping bed at the lower end of the reactor vessel, if present, or which transfers the reactor vessel wall near the cyclone itself. Preferred stripping medium is steam.

Because a particle withdrawal conduit is present no or substantially no gas can enter the cyclone from below. The cyclone in a FCC configuration is preferably designed to ensure a minimum residence time of the FCC catalyst particles in the dense fluidised bed. Preferably said minimum residence time of the catalyst is 5 seconds, more preferably this residence time is greater than 10 seconds, most preferably this residence time is more than 30 seconds. Suitably the residence time will be less than 60 seconds.

In order to avoid that the vortex present in an operational vertical cyclone contacts and erodes the upper end of the particle withdrawal conduit or enters the optionally open upper end of said conduit, a horizontal plate may suitably be present just above said opening. More preferably a vortex stabiliser is used to terminate the vortex before it reaches the open end of the withdrawal conduit. The vortex stabiliser may comprise of a vortex stabiliser plate arranged perpendicular to the central vertical axis of the cyclone and a vortex finder rod arranged parallel to said axis and extending in the direction of the gas outlet of the vertical cyclone. The position of the vortex stabiliser will be between the upper end of the catalyst withdrawal conduit and the cyclone inlet for gas and solids. One skilled in the art taking into account the need for a certain vortex length to achieve good catalyst separation can easily determine the actual position of the vortex stabiliser.

The cyclone separator according to the present invention is suitably used in a FCC process. The invention is especially directed to such a cyclone separator as part of a fluid catalytic cracking (FCC) reactor wherein the cyclone separator is fluidly connected to the downstream part of an elongated reactor riser and wherein the gas is cracked hydrocarbon vapours and the solids are cracking catalyst particles. The downstream end of the catalyst withdrawal conduit will then discharge catalyst particles to the lower end of the reactor. The reactor vessel may be suitably provided with a dense phase fluidised bed of catalyst at the lower end of the reactor vessel, provided with means to supply stripping medium as fluidization gas as for example described in the aforementioned U.S. Pat. No. 5,039,397. Separate or additional stripping vessels may also be part of the FCC unit comprising the reactor according to the invention.

The invention can find application in new FCC reactors or by modification of existing FCC reactors. Existing FCC reactors, which may be modified to a reactor according the present invention, will suitably comprise a reactor vessel comprising cyclone separation means fluidly connected to the downstream end of a reactor riser. Examples of such FCC reactors are illustrated in FIGS. 1–16, 1–17, 1–19, 1–21 and 1–22 as published in "Fluid Catalytic Cracking Technology and Operation" by Joseph W. Wilson, PennWell Publishing Company, Tulsa Okla. (US), 1997, pages 31–39. The illustrated reactors describe both embodiments wherein the upper end of the reactor riser is placed within the reactor vessel or placed outside the reactor vessel. For the present invention the location of the upper end of the reactor riser is not essential.

The cyclone separator, which is provided with the pre-stripping zone, is a so-called rough-cut cyclone or primary cyclone, in which the first separation is performed between catalyst and cracked vapour. Suitable 1 to 4 primary cyclones are fluidly connected to one reactor riser. The reactor vessel may be provided with further separation stages, for example secondary cyclones, to further separate catalyst fines from the cracked vapour. One primary cyclone may be fluidly connected to suitably 1 to 4 secondary cyclones. The design of the primary cyclone can vary. The cyclone may for example be a horizontal cyclone as described in EP-A-332277 or a conventional vertical cyclone.

If an existing primary cyclone is modified it may suitably be modified as described hereafter. An FCC reactor provided with cyclones having an upper tubular body, a converging sector connected at its lower side to a dipleg can be modified by replacing the converging part and part of the dipleg by a tubular part with a closed bottom as described above. The tubular part may have the same diameter as the diameter of the upper tubular body of the existing cyclone. The catalyst withdrawal conduit can be obtained by modification of the existing dipleg.

The lower end of the catalyst withdrawal conduit may be submerged in the dense fluidized bed of catalyst of the stripping zone or terminate above said bed level. If the conduit terminates above the fluidized bed level it is preferably provided with a valve, for example as described in co-pending PCT application PCT/EP00/06591. If the conduit terminates below the fluidised bed level a horizontal plate is preferably present below the opening.

The flow of catalyst in such a primary cyclone according to the present invention is suitably between 100 and 600 $kg/m^2.s$ as calculated at the cross-sectional area of the catalyst withdrawal conduit.

FIG. 1 shows the upper part of a fluid catalytic cracking reactor (1) consisting of the upper part of an elongated reactor riser (2) and reactor vessel (3). The reactor vessel (3) is provided with a catalyst outlet at its lower end (not shown), a cracked vapour outlet (4) at its upper end and a primary vertical cyclone separator (5). The cyclone separator (5) is provided with an inlet (6) for receiving gas and catalyst from the outlet (7) of the reactor riser (2). The cyclone further consists of an upper tubular part (8), a converging part (9) and a dipleg (10). The primary cyclone (5) is further provided with a roof (11) through which a gas outlet conduit (12) protrudes. Gas outlet conduit (12) is provided with an opening (13) for receiving stripping gas and stripped hydrocarbons, which flow from the lower situated fluidised dense stripping bed (14). The conduit (12) is fluidly connected to the gas inlet of secondary cyclone (15). Secondary cyclone (15) is provided with a dipleg (16) and a gas outlet (17), which is in fluid communication with the gas outlet (4).

Figure 2:
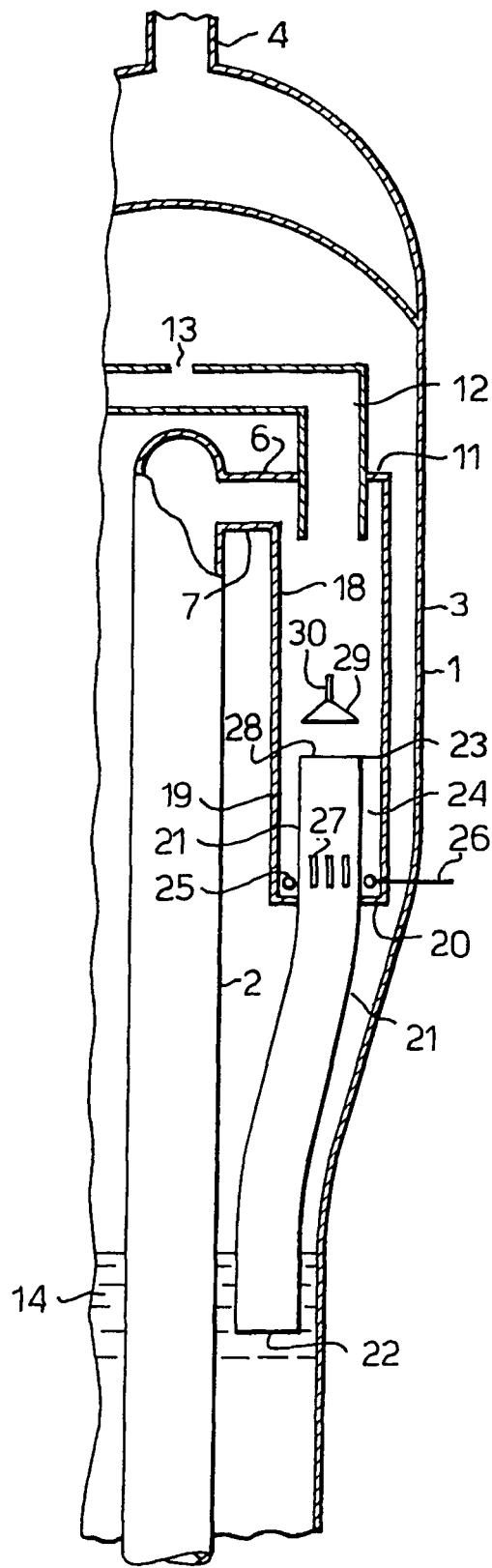
FIG. 2 illustrates a detail of a FCC reactor vessel according to the present invention.

FIG. 2 shows the reactor of FIG. 1 with a modified primary cyclone (18) provided with a lower tubular part (19). The lower tubular part (19) is provided with a closed lower end (20). Through said closed lower end (20) an open-ended vertical catalyst withdrawal conduit (21) extends from a position (22) below the closed lower end (20) into the tubular part (19) up to a position (23) below the inlet (6) for receiving gas and catalyst. Said conduit (21) has a smaller cross-sectional area than the tubular part (19), thereby defining an annular space (24) between conduit (21) and inner wall of the tubular part (19). In the lower end of this annular space (24) means (25) to add a stripping medium are present. The gas ring (25) receives stripping medium via conduit (26). The catalyst withdrawal conduit (21) is further provided with a plurality of vertical slots (27) and an opening (28) at its upper position (23). Also shown is a vortex finder consisting of a vortex stabiliser plate (29) and a vortex stabiliser finder rod (30).

Figure 3:
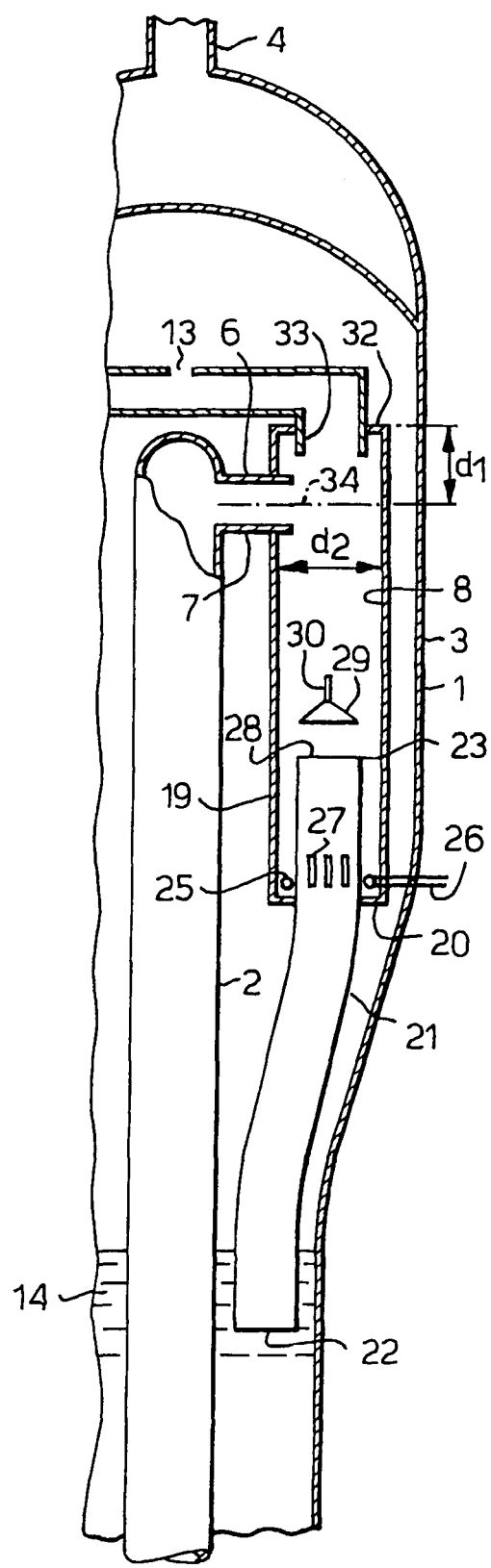
FIG. 3 shows a preferred embodiment of the invention.

FIG. 3 shows the reactor of FIG. 2 except that the primary cyclone (31) is provided with an elevated roof (32) and a gas outlet conduit (33), which protrudes the roof to a position above the inlet (6) for receiving gas and catalyst. Vertical cyclones as in FIG. 3 have shown to achieve high separation efficiency. Such cyclones are characterised in that they have an elevated roof (32) with respect to the position of the inlet (6) for receiving gas and catalyst. More preferably the elevated roof (32) is arranged at a vertical distance (d1) above the centre (34) of the tangentially arranged inlet (6) opening and wherein the ratio of this distance (d1) and the diameter (d2) of the upper tubular part (8) of the cyclone is between 0.2 and 3 and most preferably between 0.5 and 2. The gas outlet conduit (33) may protrude the elevated roof (32) from above, wherein the protrusion may range from no protrusion to about the vertical level of the inlet (6) for receiving gas and catalyst.

Figure 4:
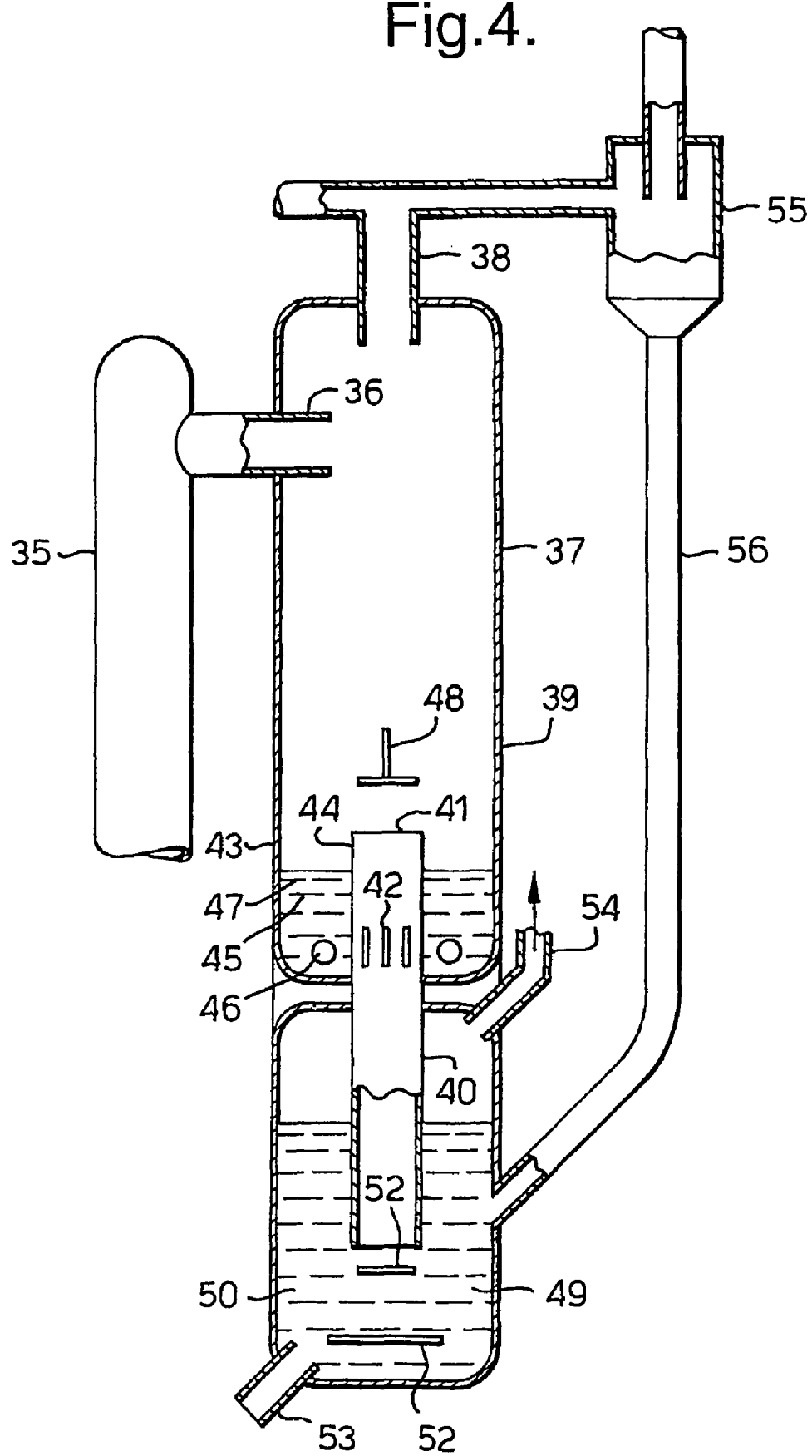
FIG. 4 illustrates a FCC process unit wherein no reactor vessel is used.

The cyclone separator and the stripping zone do not necessarily have to be present within the same reactor vessel. FIG. 4 is an example of how such an embodiment. FIG. 4 shows an external reactor riser (35) in fluid communication via tangential inlet (36) to the cyclone according to the present invention (37). This cyclone (37) is provided with a gas outlet (38) and a lower tubular part (39). Through the closed bottom of tubular part (39) a catalyst withdrawal conduit (40) is positioned having an open upper end (41) and a row of rectangular openings (42). Between the wall (43) of lower tubular part (39) and the upper part (44) of the catalyst withdrawal conduit (40) an annular space (45) is present. At the lower end of this space (45) a gas ring (46) is present for introducing steam, which keeps per-stripping zone (47) in a fluidised state. Above conduit (40) a vortex finder (48) is placed.

The catalyst discharge conduit (40) has a downstream end, which terminates in a main stripping zone (49) consisting off a fluidised bed (50) contained in a stripping vessel (51). Just below and spaced away from the lower end of the catalyst discharge conduit (40) a plate (52) is present to avoid fluidization gas from easily entering the conduit (40). Stripping vessel (51) is further provided with means (52), for example a gas ring, to supply stripping gas, a catalyst discharge conduit (53) through which catalyst is discharged to the regenerator (not shown) and a gas outlet conduit (54). Through gas outlet conduit (54) stripping gas and stripped hydrocarbons leave the stripping vessel (51). This conduit (54) may be in fluid communication with the gas outlet (38) of the cyclone separator (37) or with the downstream end of reactor riser (35).

The gas outlet (38) is fluidly connected to one or more secondary cyclones (55) (of which only one is shown). The dipleg (56) of the secondary cyclone (55) is in fluid communication with stripping vessel (51).

Figure 5:
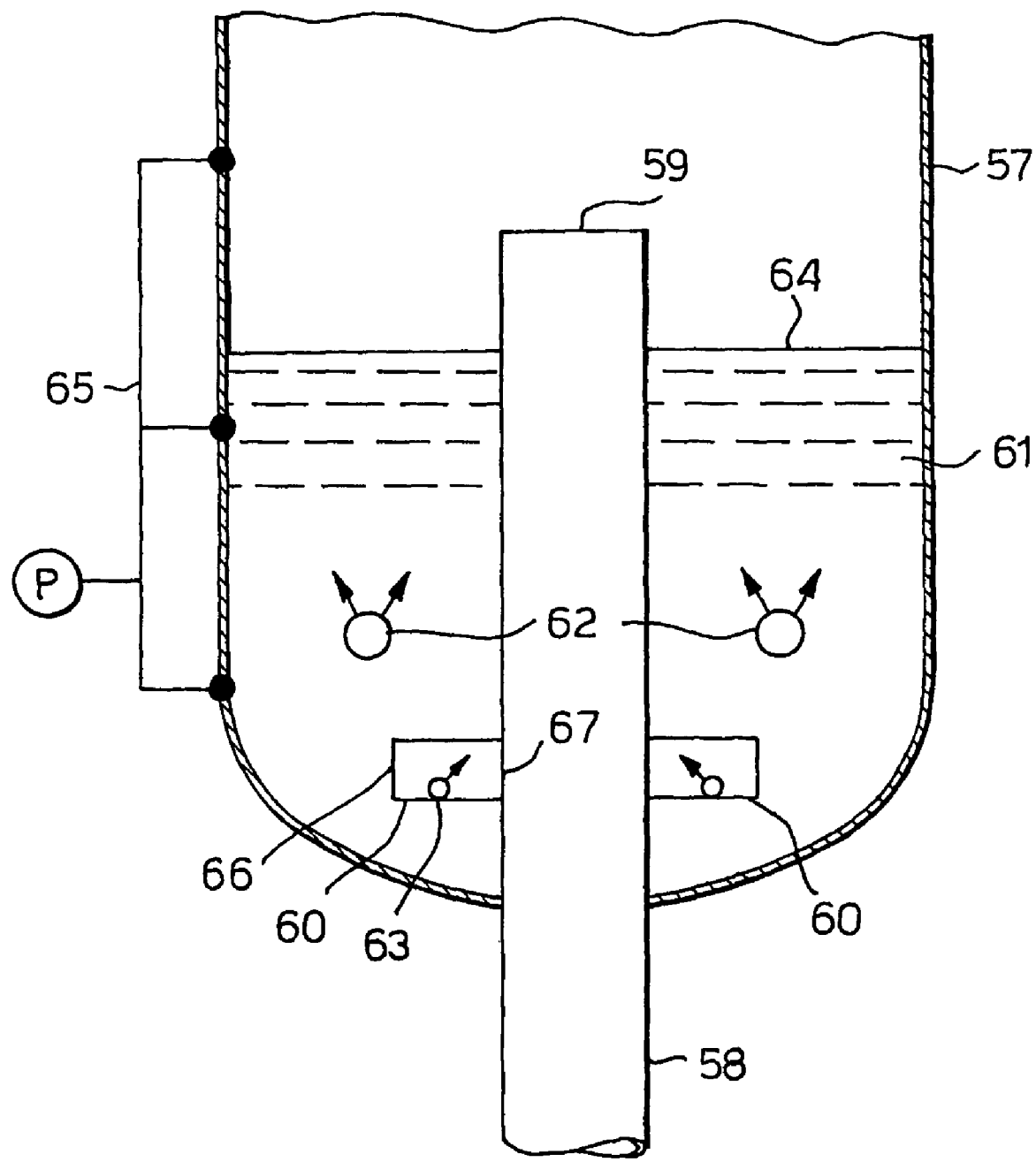
FIG. 5 illustrates the connecting conduits for control of the bed level in the tubular part.

FIG. 5 shows the tubular part (57) of the cyclone separator according to the invention. Also shown is the upper part of the particle withdrawal conduit (58) provided with an open upper end (59). Two connecting conduits (60) are shown for withdrawal of solid particles from fluidised bed (61). The open-ended conduits (60) are positioned such that the particle inlet (66) is positioned below the main means, for example steam ring (62), for adding the primary fluidised medium. The conduits (60) are further provided an outlet (67), which outlet fluidly connects conduit (60) with particle withdrawal conduit (58). Conduit (60) is further provided with a conduit (63) for adding a secondary fluidizing medium. The flow of the secondary fluidizing medium to conduit (63) can be controlled independently of the flow to steam ring (62). The bed level (64) of fluidised bed (61) can be measured with pressure measurement points (65). By adjusting the flow of the secondary fluidizing medium to conduit (63) a sufficiently high bed level can be maintained without any solids by-passing the fluidised bed via the overflow opening (59) at different catalyst circulation rates.

A solids withdrawal means for withdrawing solids from a fluidised bed through a solids withdrawal conduit as above, wherein below the means to add primary fluidizing medium separate means are present to add a secondary fluidizing medium, in order to control the flow of solids through openings present in the solids withdrawal conduit, can find application in any fluidised bed and more preferably any fluidised bed comprising FCC catalyst particles. The embodiment of FIG. 5 is an example of such a particle withdrawal means. The invention is therefore also directed to a solids withdrawal means suited to withdraw solid particles in a controlled manner from a fluidised bed of said solid particles. The solids withdrawal means comprises a substantially vertical withdrawal conduit with an open upper end protruding the fluidised bed from below. The withdrawal conduit is provided with one or more substantially horizontal conduits fluidly connecting the fluidised bed and the particle withdrawal conduit, wherein said substantially horizontal conduit is provided with means to add a secondary fluidizing medium. This substantially horizontal conduit is positioned below the position of the main means to add the primary fluidizing medium to the fluidised bed. The advantages, function and further embodiments of the solids withdrawal means are as described above for the cyclone separator.

The above fluid catalytic cracking units comprising the cyclone according to the present invention can be suitably employed to catalytically crack a hydrocarbon feedstock boiling above 370° C. to fuels boiling below 370° C. Catalysts and operating conditions as well as suitable feedstocks and preferred products may be as, for example, described in General Textbook Fluid Catalytic Cracking, Technology and Operation, Joseph W. Wilson, PennWell Publishing Company, 1997.

We claim:

1. An elongated cyclone separator vessel having an upper end and a lower tubular part which has an inner wall defining a lower tubular part cross-sectional area, wherein said elongated cyclone separator vessel is provided with an inlet for receiving gas and solid particles and a gas outlet at said upper end, wherein the lower tubular part is provided with a closed lower end, through which said closed lower end a substantially vertical particle withdrawal conduit, which defines a smaller cross-sectional area, extends from a position below the closed lower end to a position within the lower tubular part and below the inlet for receiving gas and solid particles, wherein said substantially vertical particle withdrawal conduit is provided with an opening for withdrawing solid particles from within the elongated cyclone separator vessel, and wherein said smaller cross-sectional area and said lower tubular part cross-sectional area define a space having a lower part and an upper part between said substantially vertical particle withdrawal conduit and said inner wall of the lower tubular part, and wherein provided within the lower part of said space is main means for adding a primary fluidizing medium.

2. The elongated cyclone separator vessel according to claim 1, wherein above the substantially vertical particle withdrawal conduit a vortex finder is positioned spaced away from said opening and positioned below the inlet for receiving gas and catalyst.

3. The elongated cyclone separator vessel according to claim 2, wherein said opening includes a plurality of openings above or at the same level as the main means for adding the primary fluidizing medium.

4. A reactor vessel, comprising: a reactor riser having a downstream end; at least one elongated cyclone separator vessel according to claim 3, which said at least one elongated cyclone separator vessel is fluidly connected to the downstream end of said reactor riser, wherein the reactor vessel is further provided with a gas outlet and a solid particles outlet.

5. The elongated cyclone separator vessel according to claim 2, wherein the substantially vertical particle withdrawal conduit is provided with at least one substantially horizontal conduit fluidly connecting the space of the lower tubular part and the substantially vertical particle withdrawal conduit, wherein said at least one substantially horizontal conduit is provided with means for adding a secondary fluidizing medium and is positioned below the position of the main means for adding the primary fluidizing medium.

6. A reactor vessel, comprising: a reactor riser having a downstream end; at least one elongated cyclone separator vessel according to claim 5, which said at least one elongated cyclone separator vessel is fluidly connected to the downstream end of said reactor riser, wherein the reactor vessel is further provided with a gas outlet and a solid particles outlet.

7. The reactor vessel according to claim 6, wherein said reactor vessel further includes a stripping zone.

8. A reactor vessel, comprising: a reactor riser having a downstream end; at least one elongated cyclone separator vessel according to claim 2, which said at least one elongated cyclone separator vessel is fluidly connected to the downstream end of said reactor riser, wherein the reactor vessel is further provided with a gas outlet and a solid particles outlet.

9. A solid particle withdrawal means suited to withdraw solid particles in a controlled manner from a fluidised bed of solid particles, wherein said solid particle withdrawal means comprises main means for adding a primary fluidizing medium; a substantially vertical particle withdrawal conduit protruding the fluidised bed from below, wherein the substantially vertical particle withdrawal conduit is provided with at least one substantially horizontal conduit fluidly connecting the fluidised bed at a position below the main fluidizing means and the substantially vertical particle withdrawal conduit, wherein said substantially horizontal conduit is provided with means for adding a secondary fluidizing medium.

10. The elongated cyclone separator vessel according to claim 1, wherein said opening includes a plurality of openings above or at the same level as the means for adding the primary fluidizing medium.

11. The elongated cyclone vessel separator according to claim 1, wherein the substantially vertical particle withdrawal conduit is provided with at least one substantially horizontal conduit fluidly connecting the space of the lower tubular part and the substantially vertical particle withdrawal conduit, wherein said substantially horizontal conduit is provided with means for adding a secondary fluidizing medium and is positioned below the position of the main means for adding the primary fluidizing medium.

12. A reactor vessell, comprising: a reactor riser having a downstream end; at least one elongated cyclone separator vessel according to claim 1, which said at least one elongated cyclone separator vessel is fluidly connected to the downstream end of said reactor riser, wherein the reactor vessel is further provided with a gas outlet and a solid particles outlet.

* * * * *